March 5, 1963

F. McCANN 3,079,938

PRESSURE OPERATED SHUT-OFF VALVE

Filed June 21, 1960

INVENTOR
FREDERICK McCANN
BY Ely, Fryed Hamilton
ATTORNEYS

March 5, 1963 F. McCANN 3,079,938
PRESSURE OPERATED SHUT-OFF VALVE
Filed June 21, 1960 2 Sheets-Sheet 2
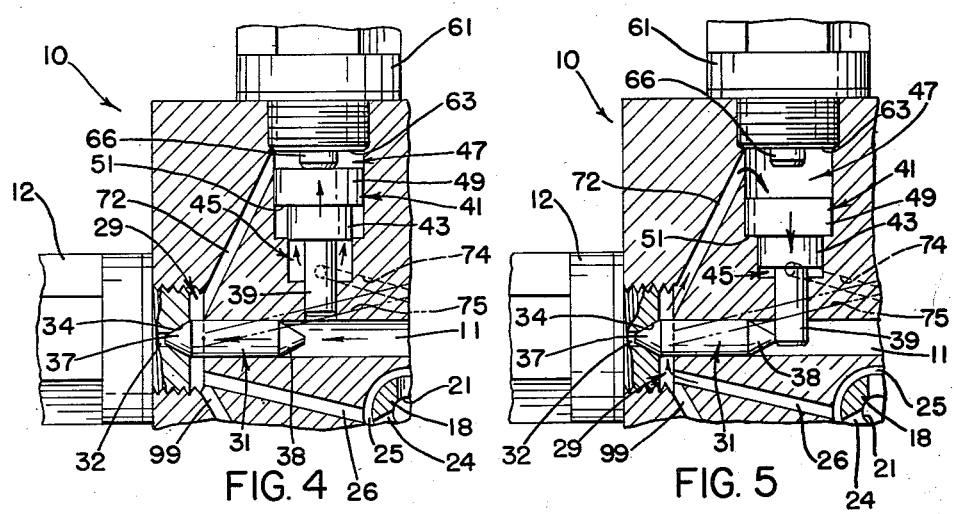
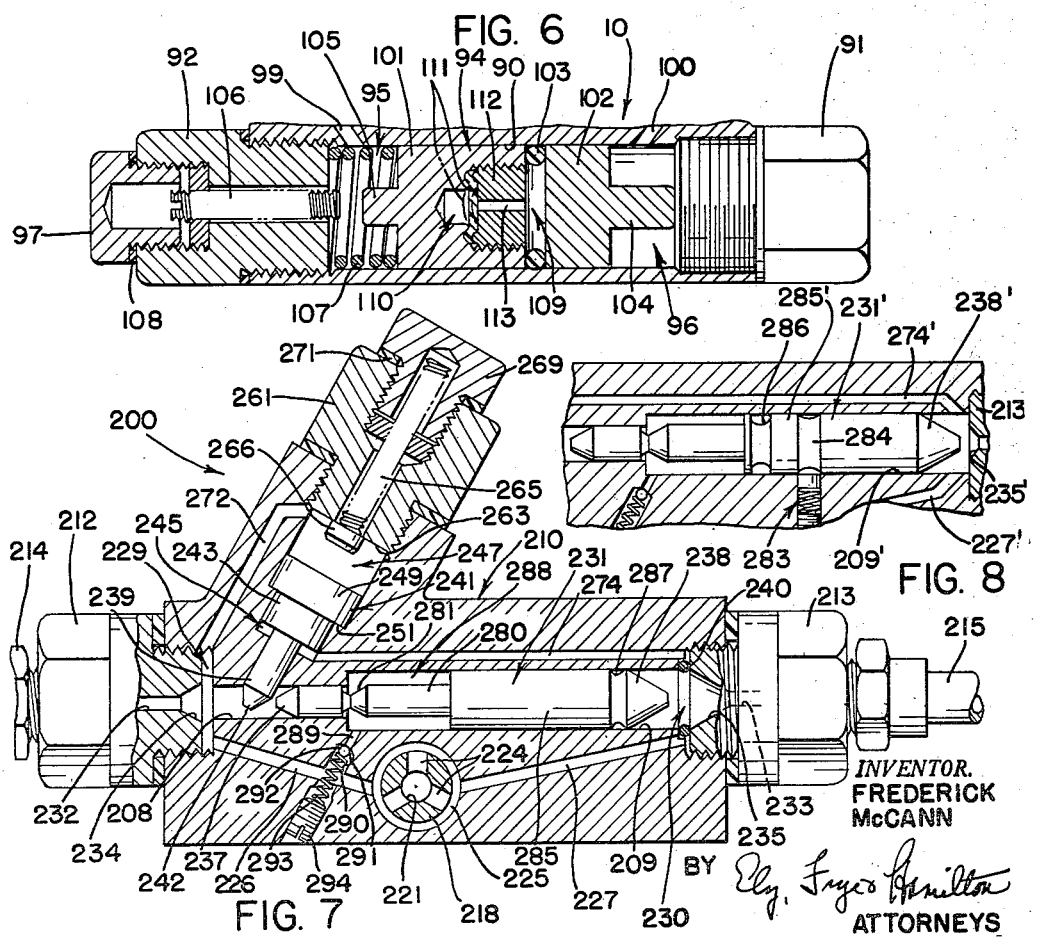
INVENTOR.
FREDERICK McCANN
BY
ATTORNEYS United States Patent Office 3,079,938
Patented Mar. 5, 1963

3,079,938
PRESSURE OPERATED SHUT-OFF VALVE
Frederick McCann, 9848 Ridgewood Drive,
Twinsburg, Ohio
Filed June 21, 1960, Ser. No. 37,720
12 Claims. (Cl. 137—118)

The invention relates generally to sealing valves. More particularly, the invention relates to a pressure operated control valve for controlling the flow of fluid from a single source to a plurality of outlets. Specifically, the invention relates to a pressure operated fluid control valve adapted to distribute to branch lines from a single inlet which will shut off the flow to a branch line, in which a malfunction results in a predetermined pressure drop, by the pressure of the fluid in the remainder of the system.

There are a variety of applications which employ a system utilizing fluid flow. One such application would be the use of fluid as an actuating means. Another application would be the use of fluid as a fuel. In these and other applications, the pressure is applied to the fluid at a master source and then the fluid or pressure is transmitted to the various servient locations by a multiplicity of conduits.

The various applications to which a pressure operated shut-off valve can be applied are innumerable. However, the valve itself is best understood by describing it in a particular application. Describing the valve in conjunction with an automotive hydraulic brake system affords ample opportunity to impart a complete disclosure.

In automotive hydraulic brake systems, actuating the brake pedal forces hydraulic fluid from a master cylinder through branch conduits to the individual brake cylinders at the wheels, and a leak in any of the branches will drain the fluid from the whole system unless a control device is provided to close off the branch where the leak occurs.

Certain prior control devices for this purpose have been provided in hydraulic brake systems, but they have been satisfactory only in systems wherein the capacities of all the branch lines and their individual brake cylinders are equal. In many systems, however, the capacity of the front wheel brake cylinders is not equal to the capacity of the rear wheel brake cylinders.

Those devices which have allowed for a differential flow have lacked criticality or been extremely complicated.

Similarly, devices have been provided for the above purpose which were not valves at all. That is, they are diaphragms which prevent communication of fluid from the master cylinder to the individual brake cylinders, but allow the transmission of pressure from the fluid on one side thereof to the fluid on the other side thereof.

It is therefore the purpose of the present invention to provide an improved pressure operated shut-off valve which will not only automatically shut off flow to a ruptured branch line but will also operate to equalize the pressure differential incident to the disparity in flow from the master cylinder to branch lines of different capacities.

Another object of the present invention is to provide an improved pressure operated shut-off valve which can be adjusted to equalize the flow to branch lines of various capacities.

A further object of the present invention is to provide a valve of this kind which will automatically shut off flow to a branch line having a slow leak.

A further object of the present invention is to provide a valve of this kind which will prevent excess fluid from escaping from a malfunctioning branch line.

A further object of the present invention is to provide a valve of this kind which will automatically shut off the fluid flow to a damaged line by the pressure of the fluid in the remainder of the system.

A further object of the present invention is to provide a valve of this kind which will operate efficiently at low pressures as well as at high pressures.

A still further object of the present invention is to provide a valve of this kind which will shut off the fluid flow and mechanically lock the valve in shut-off position with a pressure triggered locking means.

Other objects include the provision of a simple and economical control device which requires very few moving parts with minimum wear and a minimum amount of repair or adjustment.

These and other objects of the invention, as well as the advantages thereof, over existing and prior art forms, will be apparent in view of the following detailed description and the attached drawings. A preferred embodiment and an alternative form are shown by way of example in the accompanying drawings and described in detail herein. Various modifications and changes in details of construction are comprehended within the scope of the appended claims.

Referring to the drawings:

FIG. 4 is a fragmentary cross section depicting an intermediate state of a shut-off operation;

FIG. 5 is a fragmentary cross section depicting a shut-off position;

FIG. 6 is a fragmentary area of FIG. 2 in section;

FIG. 7 is a cross section through an alternative form of the present invention;

FIG. 8 is a fragmentary cross section of a shuttle plug locking arrangement adapted to be used with the FIG. 7 form of the invention;

An improved shut-off valve according to the invention includes a shuttle plug movable in a bore between two valve seats leading to two different branch lines, the plug being normally held in neutral position between the seats to allow fluid from the master pressure source to flow into both lines, and adapted to shut off either branch line due to a pressure drop therein. The bore, on both sides of the plug, is preferably connected to an equalizer which balances the uneven pressures to the branch lines caused by the initial surge of fluid to the branch having the greater capacity.

The equalizer is further constructed to balance the effect of fluid hammer or other high pressure pulsations transmitted back through the branch lines and thereby prevent the valve from being falsely tripped.

The pressure controlled detents which hold the shuttle plug in neutral position also operate to hold the shuttle plug in shut-off position when the valve is actuated.

Figure 1:
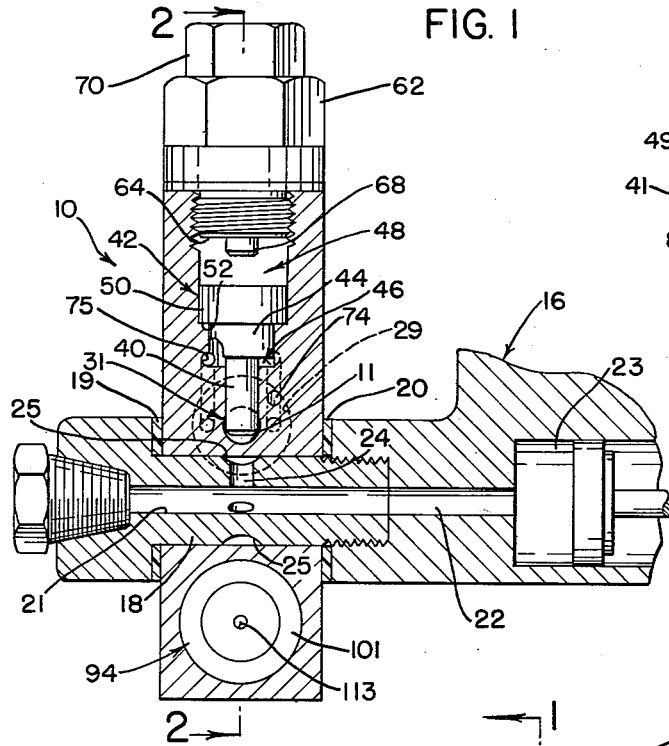
FIG. 1 is a cross section through the preferred embodiment of the present invention.

Referring to FIG. 1, the improved pressure operated shut-off valve has a body, indicated generally at 10, which has a linear bore 11 extending therethrough. Couplings 12 and 13 are secured, as by threading, to the ends of bore 11 to connect the bore to the branch conduits. When the valve is incorporated in an automotive hydraulic brake system, coupling 12 will connect with a conduit 14 leading to the brake cylinders for the front wheels and coupling 13 will connect with conduit 15 leading to the brake cylinders for the rear wheels.

The master cylinder for the hydraulic brake system is indicated generally by the numeral 16. The lower part of the body of the valve 10 is connected to the end of the master cylinder 16 by means of a hollow bolt 18 extending transversely through the body. A gasket 19 is interposed between the head of the bolt 18 and one side of the body, and a similar gasket 20 is interposed between the master cylinder 16 and the other side of the body.

Figure 2:
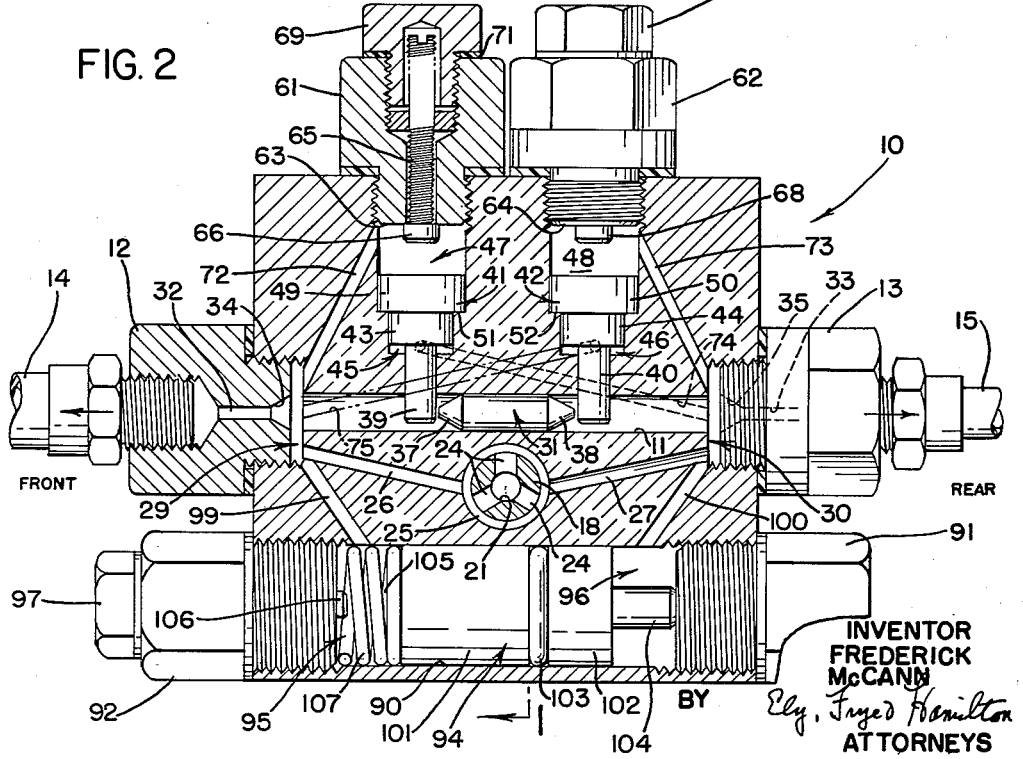
FIG. 2 is a cross section taken substantially as indicated on line 2—2 in FIG. 1.

The bore 21 of hollow bolt 18 communicates with a passageway 22 extending axially from the piston chamber 23 of the master cylinder 16. As best shown in FIG. 2, radial ports 24 connect the bore 21 of bolt 18 with an annular chamber 25 around bolt 18 within the body of valve 10. Ducts 26 and 27 lead radially outwardly from annular chamber 25 to feed outlet chambers 29 and 30, respectively. Outlet chambers 29 and 30 lie at opposite ends of bore 11 medial the extremities thereof and couplings 12 and 13, respectively.

A shuttle plug 31 is slidable in the bore 11, and is adapted selectively to close off the branch line 14 or branch line 15. The couplings 12 and 13 have reduced orifices 32 and 33, extending therethrough, at the inner ends of which are valve seats 34 and 35, respectively opposing and facing each other from opposite ends of and in alignment with bore 11. The ends 37 and 38 of shuttle plug 31 are of a conical configuration adapted to seal against the valve seats 34 and 35 in the manner shown in FIGS. 4 and 5, as hereinafter more fully described. Shuttle plug 31 is held in static position by valve stems 39 and 40 which protrude into bore 11 and generally abut the ends of plug 31. However, the stems 39 and 40 must be of sufficiently small dimension so as not to prevent communication of pressure changes in bore 11 against the plug 31.

The stems 39 and 40 are the lowermost elements of two step-down pistons indicated generally at 41 and 42, respectively. At the upper end of each stem is a lower piston portion 43 and 44, each piston portion being slidably received in a lower chamber 45 and 46. Above each lower chamber is a larger diameter upper chamber 47 and 48. Each upper chamber slidably receives an upper piston portion 49 and 50. The difference in diameter of each upper and lower piston portion defines a shoulder 51 and 52. In static position, the shoulders 51 and 52 prevent bottoming of the lower piston portions 43 and 44 in chambers 45 and 46. The difference between the area of the upper head of each piston 41 and 42, as determined by the diameter of each upper portion 49 and 50, and the area of the lower head of each piston 41 and 42, as determined by the diameter of each lower portion 43 and 44 less the area of the stems 39 and 40, controls the shuttle plug 31 as hereinafter described.

Closure plugs 61 and 62 are screwed into the body of valve 10 so that their lower faces 63 and 64 form the upper boundary of the chambers 47 and 48. As best shown in the section through plug 61 (FIG. 2), an adjusting screw 65 is threaded through the plug. The lower end portion 66 of screw 65 extends into chamber 47 to provide a stop for the upward movement of the piston 41. A similar lower screw portion 68 is provided in chamber 48. The screw 65 is also adapted to engage and hold the piston 41 in its lowered or locking position, for a purpose to be described. A cap 69 is screwed into plug 61, as is cap 70 in plug 62, which normally abuts a sealing washer 71 disposed between cap 69 and plug 61.

The upper chamber 47 communicates with outlet chamber 29 by passage 72. Similarly, upper chamber 48 communicates with outlet chamber 30 by passage 73. Lower chamber 45 communicates with outlet chamber 30 by passage 74. Similarly, lower chamber 46 communicates with outlet chamber 29 by passage 75.

Figure 3:
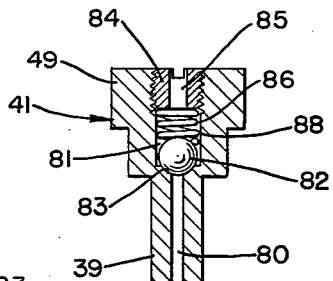
FIG. 3 is a cross section of a step-down piston used in the valve of FIG. 1.

Referring now to FIG. 3, a piston 41, and the preferably identical piston 42, is provided with a by-pass conduit 80 extending axially through stem 39 into an interior chamber 81. A check ball 82 in chamber 81 will rest on a valve seat 83 at the base of chamber 81 to close conduit 80. The upper end of chamber 81 is closed by a retaining plug 84 having an orifice 85 therethrough. A spring 86 between the plug 84 and ball 82 will yieldingly hold the ball 82 on the seat 83. This check valve assembly indicated generally by the numeral 88, is provided for a purpose to be more fully described.

Referring again to FIG. 2, a bore 90 extends horizontally through the lower body portion of valve 10. A cap plug 91 is screwed into one end of bore 90, and a closure plug 92 is screwed into the other end. Between the plugs 91 and 92 is an equalizing piston assembly 94 defining sub-chambers 95 and 96 on either side thereof. Sub-chamber 95 communicates with outlet chamber 29 by a conduit or passage 99, and sub-chamber 96 similarly communicates with outlet chamber 30 by a conduit or passage 100. Although the equalizer assembly 94 is preferably included within valve 10, as shown, it may be remotely located therefrom or even eliminated in certain forms of the invention. Those forms requiring an equalizer assembly will be apparent from the operational description hereinafter included.

As can best be seen in FIG. 6, a piston assembly 94 preferably comprises two individual pistons 101 and 102 separated by an O-ring 103. Stem 104 extending from piston 102 through sub-chamber 96 abuts cap plug 91 when the equalizer assembly 94 is in static condition. Stem 105 extends from piston 101 into sub-chamber 95. An adjustable set screw 106 may be threaded through closure plug 92 which is adapted to engage stem 105 upon a predetermined displacement of the piston 94 (to the left as viewed in FIG. 6). A spring 107 lies within chamber 95 between closure plug 92 and piston 101 yieldably to urge composite piston 94 to its static position abutting plug 91. A sealing washer 108 is provided between plug 92 and cap 97 which is screwed into plug 92 to protect the adjustment end of screw 106.

Associated with medial chamber 109 between pistons 101 and 102 is a pressure absorption compartment 110. Compartment 110 is separated from medial chamber 109 by a flexible impervious diaphragm 111 which is held in place, as by plug 112. Communication between the medial chamber 109 and the diaphragm 111 is accomplished by a passageway 113 through plug 112.

*Operation*

To facilitate understanding of an improved pressure operated shut-off valve according to the invention, its operation will also be described in an automotive environment.

Because the front wheel brake cylinders are generally of a larger diameter than are the rear wheel brake cylinders, more fluid will be required to flow to the front cylinders than to the rear cylinders. Because the summation of the pressure head, elevation head and velocity head at any point is equal to the same summation at any other point less the friction loss therebetween, a marked difference in velocity between two points will inversely affect the pressure at those points. Therefore, since the valve according to the invention operates by a pressure differential, it is necessary to compensate for this natural flow differential through the valve during the initial application of the brake pedal.

As the brake is applied, assuming that the braking system is full of fluid, fluid from the master cylinder piston chamber 23 is forced outwardly thereof into bore 21 of bolt 18 and thence into ducts 26 and 27 radially emanating from annular chamber 25 into outlet chambers 29 and 30. As will soon be described, the pressure differential between outlet chambers 29 and 30 determines the operation of the shut-off. To prevent premature closure of the valve, the initial difference in pressure due to the greater flow through outlet chamber 29 to the front cylinder is equalized by the operation of equalizing piston assembly 94. That is, a volume substantially equal to the flow differential is supplied from subchamber 95 into the outlet chamber 29 through conduit 99. The fluid is expelled from chamber 95 both because of the velocity of flow from outlet chamber 29 into conduit 14 and because the pressure build-up in outlet chamber 30 volumetrically expands through conduit 100 into chamber 96 moving piston assembly 94 to the left (as viewed in FIG. 6), thus giving further impetus for the expulsion of fluid from chamber 95 into outlet chamber 29.

It has been found that criticality of the valve increases as the linear movement of piston 94 required to compensate for the initial flow differential is decreased. As a general rule, the diameter of the piston assembly 94 is preferably such that the effective head area in each sub-chamber, 95 and 96, is equal to the total difference in the head area of the front and rear brake cylinders.

Set screw 106 is preferably adjusted to abut stem 105 when a volume approximately equivalent to the volumetric difference in flow has been expelled from chamber 95. In this way, satisfactory allowance is made for normal initial pressure differentials but the sensitivity of the valve is not thereafter impeded. The volume permitted to be expelled can be pre-established by adjusting screw 106 for timely contact with stem 105.

It is apparent that this compensation can be properly effected only if the piston assembly 94 seeks a static position whereby a sufficient volume of fluid is available from chamber 95 to satisfy the flow requirement. To this end, piston 93 is yieldably urged to its static position by spring 107. In the automotive environment, spring 107 has been found to be preferably equivalent in strength to the returning spring for the brake cylinder.

In a properly functioning brake system after the brake cylinders have been actuated, the flow ceases, and a static high pressure condition is maintained throughout the system so long as the brake pedal is depressed. High pressure pulsations transmitted through the system can be damaging if not absorbed. Such pulsations can, for example, be the result of fluid hammer incident to instantaneous application of full braking power or an out-of-round brake drum. The compressibility of O-ring 103 dissipates the energy of the reverberant pulsations by permitting pistons 101 and 102 of piston assembly 94 yieldingly to converge and thereby absorb the shock.

Convergence of pistons 101 and 102 would require that medial chamber 109 be filled wtih a relatively compressible fluid. However, in actual practice the brake fluid will seep around pistons 101 and 102 to enter and fill medial chamber 109. Therefore, the composite piston 94 is preferably supplied with shock absorbing compartment 110 which is filled with a readily compressible fluid, such as air. The impervious diaphragm 111 can easily flex inwardly of compartment 110, as shown in phantom in FIG. 6, to accommodate the fluid accumulated within medial chamber 109 when pistons 101 and 102 converge.

The static condition, depicted by FIG. 2, will be maintained irrespective of the operational fluctuations incident to applying pressure to the fluid within the system. During the normal braking operation, the system can be termed pressurized; that is, the static unit pressure imparted to the fluid is constant throughout the system, including the various passages, conduits, ducts and chambers within valve 10. Of special importance, the unit pressure in chambers 45, 46, 47 and 48 is equal. However, since the upper piston portion 49 has a greater head area than does the lower piston portion 43, there is a force differential acting on piston 41 with an effective downward direction. Piston 42 is the recipient of a similar fluid force unbalance. As a result of this continuous force unbalance, the stems 39 and 40 maintain shuttle plug 31 therebetween.

The head area unbalance is as equally effective with negative pressure as with positive pressure. Therefore, the release of the brake pedal, which causes a sudden release of the pressure would have the effect of causing a force differential acting on pistons 41 and 42 with an effective upward direction. This force unbalance is compensated without imparting an upward motion to the pistons 41 and 42 by permitting fluid to travel upwardly through pistons 41 and 42, as by check valve 88 and its associated by-pass conduit 89. This result could also be attained by supplying a light spring (not shown) in chambers 47 and 48 yieldably maintaining pistons 41 and 42 in locking position without the necessity for by-pass conduit 89.

Should a rupture occur in one of the lines, a slow leak develop or any malfunction associated with loss of fluid from any point in the system belond the valve 10, the conduit communicating with that part of the system would be shut off.

For example, assume a malfunction results in a loss of fluid from that portion of the system fed by conduit 14. When the loss exceeds the flow differential balanced by the equalizing piston assembly 94, the pressure in outlet chamber 29 will drop below that in outlet chamber 30. Chamber 47, which is in direct communication with outlet chamber 29, will reflect this pressure drop with a corresponding decrease in the force against the upper piston portion 49. Chamber 45, however, which is in direct communication with outlet chamber 30, will maintain the same force against the lower piston portion 43. The force differential acting on piston 41 is now reversed with the effective force unbalance acting in an upward direction. This causes piston 41 to move upwardly, thus removing stem 39 from bore 11, as shown in FIG. 4. Simultaneously, the pressure differential reflected in bore 11 results in a greater force acting on conical end 38 than on conical end 37 of shuttle plug 31. Plug 31, therefore, is moved from its inoperative static position, as shown in FIG. 2, along bore 11 until end 37 seats against seat 34 in coupling 12. Communication with conduit 14 is thereby eliminated and the pressure in outlet chamber 29 again becomes equivalent to that in outlet chamber 30. Similarly, the pressure in chamber 47 is increased and the force differential acting on piston 41 again assumes a downward direction. As piston 41 moves downwardly, stem 39 re-enters bore 11, to abut end 38 of shuttle plug 31, as shown in FIG. 5. FIG. 5 depicts a shut-off position. The shut-off position is also a static condition. That is, this position will be maintained until the valve is reset. Therefore, actuation of the valve thereafter will operate the rear wheel brakes connected to conduit 15 without further loss of fluid from the system.

Had the assumed malfunction resulted in a loss of fluid from that portion of the system fed by conduit 15, the shuttle plug 31 would have seated against seat 35 in coupling 13 by the exact reverse of the operation described above.

*Resetting*

After a leak in any of the lines has been repaired, the shuttle plug 31 is manually returned to its neutral position, and before continuing operation of the system it is necessary to bleed the air out of the repaired line at the wheel brake cylinder, as the fluid is replenished and forced from the master cylinder 16 into the repaired line. At this time the reduced pressure in the repaired line would tend to cause the plug 31 to shut-off that line as described above.

Accordingly, before bleeding the repaired line 14, to continue the example, the cap 69 is removed, and adjusting screw 65 is screwed downwardly through closure plug 61 until the lower end portion 66 engages upper portion 49 to hold piston 41 so that stem 39 immovably abuts end 37 of shuttle plug 31 and positively prevents any movement of the shuttle plug 31. Of course, if any bleeding is required in that part of the system fed by conduit 15, piston 42 should be similarly immobilized.

After the repaired line has been bled of air, and the system filled with fluid, the screw 65 is retracted and the cap 69 replaced.

*Alternative Form*

The alternative embodiment may also be used with an equalizing piston assembly 94 as described in conjunction with the preferred embodiment. However, the alternative embodiment is disclosed without referring to an equalizer since it can be completely understood without the repetitious discussion of the operation thereof.

Referring now to FIG. 7, an alternative form of pressure operated shut-off valve 200 has a body indicated generally by the numeral 210. Preferably, concentric bores 208 and 209 extend through body 210. Couplings 212 and 213 are secured, as by threading, to the ends of bores 208 and 209 to connect them to branch lines 214 and 215 leading to the brake cylinders for the front and rear wheels, respectively. A hollow bolt 218 extends transversely of body 210 to connect the valve 200 to the master cylinder (not shown). Radial ports 224 connect bore 221 of bolt 218 with an annular chamber 225 around bolt 218 within the body 210 of valve 200. Ducts 226 and 227 lead radially outwardly from annular chamber 225 to connect with outlet chambers 229 and 230, respectively. Outlet chambers 229 and 230 lie medially the extremity of bore 208 and coupling 212 and bore 209 and coupling 213, respectively.

A shuttle plug 231, part of the axial dimension of which is of reduced radial dimension, is adapted to slide in concentric bores 208 and 209 selectively to close branch line 214 or 215. The couplings 212 and 213 have reduced orifices 232 and 233 extending therethrough, at the inner ends of which are valve seats 234 and 235, respectively. The ends 237 and 238 of shuttle plug 231 are of a conical configuration adapted to seal against valve seats 234 and 235.

Shuttle plug 231 is held in static position by valve stem 239 which protrudes into bore 208. Stem 239, which must not prevent communication of pressure changes in bore 208 against the plug 231, depends from step-down piston 241. The lower and upper heads of piston portions 243 and 249 are acted upon by the pressures within their respective chambers 245 and 247. The lower portion 243 is of a smaller diameter than the upper portion 249. The juncture of these two portions defines a shoulder 251 on step-down piston 241. In static position shoulder 251 prevents bottoming of lower portion 243. The construction of step-down piston is preferably identical with that of piston 41, as shown and described in conjunction with FIG. 3. However, the end 242 of stem 239 is preferably of a more tapered configuration to be received in an annular groove 281 on the lesser diameter portion 280 of shuttle plug 231 when the plug 231 is in one of the static closed positions, as will be more fully described.

A closure plug 261 is screwed into valve 200 so that its lower face 263 forms the upper boundary of chamber 247. An adjusting screw 265 is threaded through plug 261. The lower end portion 266 of screw 265 preferably extends into chamber 247 sufficiently to prevent the piston 241 from topping and thereby eliminating chamber 247. Screw 265 is also used to allow the air to be bled from the system by retaining shuttle plug in a static position consistent with which branch of the system is being bled. That is, static neutral to bleed that portion of the system fed by conduit 214 and static shut-off against seat 234 to bleed that portion of the system fed by conduit 215. A cap 269 is screwed into plug 261 which normally abuts a sealing washer 271 disposed between cap 269 and plug 261.

The upper chamber 247 communicates with outlet chamber 229 by passage 272. The lower chamber 245 communicates with outlet chamber 230 by passage 274.

Since the end 238 of shuttle plug 231 has a greater surface area than does end 237, the fluid in a normally filled system will maintain a force differential on plug 231 with an effective leftward direction (as viewed in FIG. 7). Similarly, the greater head area on piston portion 249 of piston 241 than on piston portion 243 will result in a force differential on piston 241 with an effective downward direction, as described in greater detail hereinbefore with respect to the operation of pistons 41 and 42. The unbalance of this fluid pressure forces maintains shuttle plug 231 in its static neutral position abutting stem 239.

Figure 9:
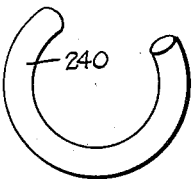
FIG. 9 is a schematic representation of a ring clip used in the alternative form of the valve.

In a less than completely full system, or a system subjected to external vibrations when the system is not pressurized, additional assistance may be desired to supplement the unbalanced fluid forces in retaining plug 231 in neutral static position. A ring clip 240, as shown in FIG. 9, may be provided in outlet chamber 230. If the inside diameter of the ring clip 240 is less than the outside diameter of shuttle plug 231, a portion of the conical end 238 will contact the ring 240 before the plug 231 can seal against seat 235—thus precluding the valve from accidentally shutting off that branch. Ring clip 240 is preferably less than a complete circle in order that the fluid flowing from and to the outlet chamber 230 will not be impeded. However, it must be borne in mind that clip 240, though flexible, must be sufficiently stiff to prevent being blown into the conduit 215 by the initial pressure surge to which the valve 200 may be subjected.

Assistance in retaining shuttle plug 231 in static position may also be rendered without the need for an outlet chamber 230. Referring to FIG. 8, duct 227' may feed directly into bore 209' in proximity to coupling 213'. Passage 274' may similarly enter bore 209'. In such an embodiment a spring detent 283 may seat in a slight annular groove 284 on the large portion 285 of shuttle plug 231' yieldingly assisting to maintain shuttle plug 231' in neutral static position. A relatively deeper annular groove 286 could also be supplied on the larger portion 285 of shuttle plug 231' to receive detent 283 when end 238' has sealed against seat 235' and thereby maintain plug 231' in static shut-off position.

Referring again to FIG. 7, one static shut-off position would obtain should a malfunction result in loss of fluid from that portion of the system fed by conduit 215. That is, the pressure in outlet chamber 230 would drop below that in outlet chamber 229, thereby reversing the force differential acting on shuttle plug 231. With the force differential having an effective rightward direction, shuttle plug would be forced past clip 240 into sealing engagement with seat 235. By providing an appropriate annular groove 287 on portion 285 into which clip 240 could seat, plug 231 could be locked in static shut-off position. Of course, the thickness of clip should not be too much less than the axial dimension of chamber 230 so as to limit the axial wobble of plug 231, once seated. Some dimensional differential can be accommodated by so sloping the slopes of groove 287 that the constricting action of clip 240 also exerts a pressure on plug 231 effective to seal as well as lock.

Should a malfunction result in loss of fluid to that portion of the system fed by conduit 214, the pressure in outlet chamber 229 and its associated piston chamber 247 would drop below that in outlet chamber 230 and its associated piston chamber 245. As more fully described in conjunction with piston 41, piston 241 would be raised and plug 231 would be forced to seal against seat 234. With pressure once again maintained in outlet chamber 230 and piston chamber 248 piston 241 would be moved downwardly. End 242 of stem 239 would engage groove 281 to lock plug 231 in sealing position against seat 234 in the alternative static shut-off position.

A chamber 288 results because of the diametric difference between portion 285 of shuttle plug 231 and bore 209 when plug 231 is positioned other than in sealing engagement with seat 234. Fluid will seep into and fill chamber 288, impeding efficient leftward movement of plug 231 when the occasion demands. To facilitate plug 231 being moved in a leftward direction, provision for ample unidirectional flow of fluid from chamber 288 to duct 226 should be provided, as by bores 289 and 290 joined by seat 291 for ball valve 292. A spring 293 retained by plug 294, prevents ball valve 292 from entering duct 226.

What is claimed is:

1. A pressure operated shut-off valve having a body with conduit connections, each conduit connection having an interior passage for fluid flow, a bore through said body, a pressure fluid inlet remotely of said bore, opposed and facing axially aligned valve seats, one at each end of said bore, a shuttle plug slidable in said bore and adapted selectively to seat on either of said valve seats, an outlet chamber at each end of said bore between said valve seats, each of said outlet chambers communicating with said inlet and, through an adjacent valve seat, with the interior passage of a conduit connection, the fluid pressure at each outlet chamber operating positively to seat said shuttle plug on one of said valve seats, and communicating with means selectively to maintain said shuttle plug in neutral position and lock said shuttle plug in seating engagement with one of said valve seats.

2. A pressure operated shut-off valve as defined in claim 1 having flow equalizing means communicating with said outlet chambers.

3. A pressure operated shut-off valve having a body with conduit connections, each conduit connection having an interior passage for fluid flow, a bore through said body, a pressure fluid inlet remotely of said bore, opposed and facing axially aligned valve seats, one at each end of said bore, a shuttle plug slidable in said bore and adapted selectively to seat on either of said valve seats, an outlet chamber at each end of said bore between said valve seats, each of said outlet chambers communicating with said inlet and, through an adjacent valve seat, with the interior passage of a conduit connection, the fluid pressure at each outlet chamber operating positively to seat said shuttle plug on one of said valve seats, piston means, said piston means having opposed heads, a piston chamber associated with each of said heads, the fluid pressure at one said outlet chamber operatively communicating with one of said piston chambers, the fluid pressure of the other outlet chamber operatively communicating with the opposed piston chamber.

4. A pressure operated shut-off valve having a body provided with a through bore, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, piston means for selectively maintaining said shuttle plug in static neutral and shut-off positions, said piston means having opposed heads, the effective surface area of one of said heads being greater than the effective surface area on the opposed head, piston chambers associated with each of said heads, the piston chamber associated with the larger of said heads communicating with one outlet chamber and the piston chamber associated with the smaller of said heads communicating with the other outlet chamber.

5. A pressure operated shut-off valve having a body provided with a through bore, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, a piston reciprocatingly slidable in said valve, a stem affixed to said piston adapted to be extended into said bore to maintain said shuttle plug in neutral static position and to be selectively retracted from said bore, said piston having opposed heads, the effective surface area of one of said heads being greater than the effective surface area on the opposed head, piston chambers associated with each of said heads, the piston chamber associated with the larger of said heads communicating with one outlet chamber and the piston chamber associated with the smaller of said heads communicating with the other outlet chamber.

6. A pressure operated shut-off valve having a body provided with a through bore, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, dual pistons reciprocatingly slidable in said valve, a stem affixed to each of said pistons, said stems adapted to be extended into said bore to maintain said shuttle plug in neutral static position therebetween or in shut-off static position when said shuttle plug is selectively seated in either of said conduit connections, said stem is further adapted to be selectively retracted from said bore, said pistons each having opposed heads, the effective surface area of one of said heads being greater than the effective surface area on the opposed head, piston chambers associated with each of said heads, the piston chamber associated with the larger of said heads communicating with one outlet chamber and the piston chamber associated with the smaller of said heads communicating with the other outlet chamber.

7. A pressure operated shut-off valve having a body provided with a through bore, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, dual pistons reciprocatingly slidable in said valve, a stem affixed to each of said pistons, said stems adapted to be extended into said bore to maintain said shuttle plug in neutral static position therebetween or in shut-off static position when said shuttle plug is selectively seated in either of said conduit connections, said stem is further adapted to be selectively retracted from said bore, a passage axially of said stem selectively permitting communication from said bore to one of said piston chambers, said pistons each having opposed heads, the effective surface area of one of said heads being greater than the effective surface area on the opposed head, piston chambers associated with each of said heads, the piston chamber associated with the larger of said heads communicating with one outlet chamber and the piston chamber associated with the smaller of said heads communicating with the other outlet chamber.

8. A pressure operated shut-off valve having a body provided with a through bore, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, dual pistons reciprocatingly slidable in said valve, a stem affixed to each of said pistons, said stems adapted to be extended into said bore to maintain said shuttle plug in neutral static position therebetween or in shut-off static position when said shuttle plug is selectively seated in either of said conduit connections, said stem is further adapted to be selectively retracted from said bore, a passage axially of each of said stems and its associated piston, a check valve in said passage permitting unidirectional flow from said bore to the chamber associated with the larger of said piston heads, said pistons each having opposed heads, the effective surface area of one of said heads being greater than the effective surface area on the opposed head, piston chambers associated with each of said heads, the piston chamber associated with the larger of said heads communicating with one outlet chamber and the piston chamber associated with the smaller of said heads communicating with the other outlet chamber.

9. A pressure operated shut-off valve having a body provided with a through bore and an equalizing chamber, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, pistons for selectively maintaining said shuttle plug in static neutral and shut-off position, each of said pistons having opposed heads, a piston chamber associated with each of said heads, one of said piston chambers for each piston communicating with one outlet chamber and the opposed piston chamber communicating with the other outlet chamber, said equalizing chamber comprising an equalizing piston slidable in a bore and adapted yieldingly to be maintained substantially medially of the ends of said bore, that portion of the bore on one side of said equalizing piston communicating with one outlet chamber and that portion of the bore on the other side of said equalizing piston communicating with the other outlet chamber.

10. A pressure operated shut-off valve having a body provided with a through bore and an equalizing chamber, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, pistons for selectively maintaining said shuttle plug in static neutral and shut-off position, each of said pistons having opposed heads, a piston chamber associated with each of said heads, one of said piston chambers for each piston communicating with one outlet chamber and the opposed piston chamber communicating with the other outlet chamber, said equalizing chamber comprising a composite equalizing piston slidable in a bore, stop means on one side of said equalizing piston and resilient means on the other side of said equalizing piston yieldingly to maintain said equalizing piston substantially medially of said bore, that portion of the bore on one side of said equalizing piston communicating with one outlet chamber and that portion of the bore on the other side of said equalizing piston and communicating with the other outlet chamber.

11. A pressure operated shut-off valve having a body provided with a through bore and an equalizing chamber, conduit connections at opposite ends of said bore having valve seats therein, outlet chambers medially of said conduit connections and said bore, a shuttle plug slidable in said bore adapted selectively to seat on said valve seats, a fluid inlet communicating with said outlet chambers, pistons for selectively maintaining said shuttle plug in static neutral and shut-off position, each of said pistons having opposed heads, a piston chamber associated with each of said heads, one of said piston chambers for each piston communicating with one outlet chamber and the opposed piston chamber communicating with the other outlet chamber, said equalizing chamber comprising a composite equalizing piston slidable in a bore, said composite equalizing piston divided by an elastic means and a shock absorbing means associated with said equalizing piston, stop means on one side of said equalizing piston and resilient means on the other side of said equalizing piston yieldingly to maintain said equalizing piston substantially medially of said bore, that portion of the bore on one side of said equalizing piston communicating with one outlet chamber and that portion of the bore on the other side of said equalizing piston communicating with the other outlet chamber.

12. A pressure operated shut-off valve having a body provided with a through bore, said bore comprised of aligned bores of different diameter, conduit connections at opposite ends of said through bore having valve seats therein, a shuttle plug a portion of which is slidable in each of said concentric bores adapted selectively to seat on said valve seats, a fluid inlet communicating with said concentric bores, the fluid pressure in said bores at said conduit connections operatively communicating with said bore selectively to seat said shuttle plug on one of said valve seats and also communicating with means to maintain said shuttle plug in static neutral and shut-off positions.

References Cited in the file of this patent
UNITED STATES PATENTS

| | | |
|---|---|---|
| 2,115,637 | Leonard | Apr. 26, 1938 |
| 2,381,484 | Blank | Aug. 7, 1945 |
| 2,386,585 | Blank | Oct. 9, 1945 |
| 2,534,871 | Lichtman | Dec. 19, 1950 |
| 2,764,176 | Darquier | Sept. 25, 1956 |
| 2,854,016 | Margida | Sept. 30, 1958 |
| 2,956,577 | Kirkham | Oct. 18, 1960 |
| 3,010,469 | Leighton | Nov. 28, 1961 |